United States Patent [19]

Ferrarini, Jr. et al.

[11] 4,079,022

[45] Mar. 14, 1978

[54] FIRE RETARDANT RESIN COMPOSITIONS CONTAINING MOISTURE RESISTANT LOW MELTING PHOSPHATE GLASS

[75] Inventors: Louis J. Ferrarini, Jr., Aston, Pa.; Joseph Feltzin, Wilmington, Del.

[73] Assignee: ICI Americas Inc., Wilmington, Del.

[21] Appl. No.: 688,638

[22] Filed: May 21, 1976

[51] Int. Cl.² ............................................. C08K 3/32
[52] U.S. Cl. ......................... 260/2.5 FP; 106/308 B; 260/45.7 P; 260/45.75 P; 260/45.75 V; 260/45.75 W; 428/406
[58] Field of Search ............................ 106/308 B, 308; 260/DIG. 24, 2.5 FP, 45.7 P, 45.75 P, 45.75 V, 45.75 W; 428/406

[56] References Cited

U.S. PATENT DOCUMENTS

| | | | |
|---|---|---|---|
| 1,943,525 | 1/1934 | Gundloch | 106/308 B |
| 3,030,215 | 4/1962 | Veatch et al. | 428/406 X |
| 3,630,764 | 12/1971 | Shannon | 260/DIG. 24 |
| 3,816,107 | 6/1974 | Searight et al. | 428/406 X |
| 3,933,689 | 1/1976 | Roz et al. | 260/DIG. 24 |

*Primary Examiner*—Sandra M. Person

[57] ABSTRACT

Moisture sensitivity of glass used as a reinforcing and fire retarding resin filler is improved by surface treating the particulate or fibrous glass with alkaline solutions of magnesium, calcium, barium, iron, aluminum, lead or zinc compounds.

13 Claims, No Drawings

FIRE RETARDANT RESIN COMPOSITIONS CONTAINING MOISTURE RESISTANT LOW MELTING PHOSPHATE GLASS

The invention relates to fire retardant plastic materials containing particulate or fibrous phosphate glass fillers. In particular, it relates to a process for preparing moisture resistant low softening point glass defined as compositions having a transformation temperature not greater than 300° C. and a $P_2O_5$ content ranging between 50 and 72 mol percent. Most particularly, it is directed to the formation of moisture insensitive or less hygroscopic phosphate glass compositions having surface coatings of less water sensitive phosphate salts of magnesium, calcium barium, iron, aluminum, lead or zinc.

Many thermosetting resins such as polyesters, epoxy, polyurethane, phenol/formaldehyde, resoles and novolaks and mixtures of these, along with such things as polyethylene polypropylene, polystyrene, butadiene and the like under certain circumstances will support combustion. These materials may in their cured state be rendered fire retardant by the incorporation of certain additives such as antimony oxide, or tris(beta-chloroethyl)phosphate. Recently, however, it has been disclosed (West German Offenlegungschrift No. 2,321,173 and W. G. Off. No. 2,329,123) that the incorporation of a glass of low softening temperature particularly a phosphate glass into a reinforced thermosetting resin confers fire retardant properties upon the cured resin. The mechanism is believed to involve the melting of the low softening point glass with the approach of a flame and the formation of a protective skin of fused glass at the interface between the resin and the glass surface. The fire retardancy of the phosphate glass is also improved by the incorporation in the resin of a blowing agent, that is, a compound which decomposes upon heating to liberate one or more non-flammable gases.

Of particular interest to the invention are low softening point phosphate glasses having a transformation temperature (Tg) no greater than 300° C. An approximate correlation between softening point and transformation temperature is that the softening point is generally 50°–70° C. above the transformation temperature.

Phosphate glasses of particular interest to this invention are inorganic oxide glasses having a mol percent composition in the range as follows: $B_2O_3$ 1.2–3.5%; $P_2O_5$ 50–72%; PbO 0–30%; and at least 1 oxide selected from the oxides of Cu, Ag, Au, Sc, Y, La, Ti, Zr, Hf, V, Nb, Ta, Cr, Mo, W, Mn, Tc, Re, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, Th, Pd, and U 0–5%; and which glass contains at least 1 oxide selected from alkali metal oxides and at least 1 oxide from alkaline earth metal oxides and zinc oxides. Preferred lead oxide containing glasses are made when the lead oxide ranges from 10–30 mol percent and the $P_2O_5$ in the composition ranges from 50–58 mol percent.

Preferred glasses are formed which contain at least 14 mol percent alkali metal oxides selected from the group consisting of sodium, lithium and strontium oxides. Preferred compositions also contain at least 2 mol percent of alkaline earth oxides selected from barium, calcium and magnesium as well as zinc oxide.

While these compositions are sufficiently low melting for use as a flame or fire retardant in resins they are deficient in that they are hygroscopic and pick-up moisture from the atmosphere which causes resin surfaces containing them to become wet with phosphoric acid containing water droplets. Prolonged exposure of the fire retardant resin panels exposed to high humidity results in loss of weight and loss of fire retardancy which can be traced to the extraction of phosphate glass by water. Furthermore, surrounding materials can be corroded by leached out phosphoric acid.

It is an object of this invention to produce a relatively hydrophobic phosphate glass composition useful as a fire retardant filler or reinforcing agent for organic resins.

It is another object of the invention to provide a process for treating glasses containing a high concentration of $P_2O_5$ to render them less susceptible to moisture pick-up.

It is a further object of this invention to provide a phosphate glass having a surface coating of phosphate salts selected from magnesium, calcium, barium, iron, aluminum, lead or zinc.

Another object is to provide an organic resin having moisture resistant phosphate glass as a filler.

These and other objects of the invention are accomplished by treating a phosphate glass, particularly one having a composition as described above, with alkaline solutions containing ions of magnesium, calcium, barium, iron, aluminum, lead or zinc formed by dissolving compounds containing them in polar solvents. Such materials, such as hydroxides, nitrates, bromides, etc., are useful provided their solutions are adjusted to pH's above 7. Any metallic soluble salt can be used which will react with exposed phosphate to form water-insoluble phosphate on the exposed surface of the glass particle. The solution should be as concentrated as possible to prevent dissolution of the glass.

Since the low softening point glass may be in the form of fibers, flakes, or ground particles, the surface area will vary widely. Therefore, the treatment time and concentration of the metal salt solutions required to produce satisfactory results will necessarily have to be determined by trial and error for a particular glass composition and particle size. As a guide, satisfactory results are ordinarily obtained from solutions having a metal ion concentration such that the weight of the metal ion present is from 5–25 percent of the weight for the glass powders being treated for glass particulate sizes ranging from 10–300 microns in diameter. In most instances a metal ion concentration of 8–10 percent produces satisfactory coatings. Of course, when flakes or fibers are treated the ionic strength need not be as great.

The treatment time required is also a variable which can be determined by trial and error since the degree of mixing, the temperature of the solution and the volume must be taken into consideration. Degree of agitation is also a factor.

In general, high surface area materials require much more treatment and exposure to gain satisfactory results. While the low surface area materials such as fibers and flakes are better reinforcing agents for resin compositions, they provide a lower degree of flame retardancy. Therefore, while the small particles with high surface area provide, when evenly mixed throughout the resin, a better flame retardancy the strength of the material must be enhanced by the incorporation of fibrous or flaked glass for maximum strength. Actually, a combination of fibers and small particle size material produce the best results.

The low softening point glass incorporated into a fiber reinforced composite material is preferably in the form of a granular powder of particle size substantially in the range of 100–300 microns diameter. The glass may be granulated, for example, by a two-plate grinding mill and thereafter dispersed in the liquid treatment solution and dried prior to its incorporation with resin. The dispersion of low softening point glass in the resin may then be added to or blended with reinforcing fibers which may or may not be of treated phosphate glass.

The treatment of the particulate glass may be carried out in a ball mill, a fluidized bed or a stirred container. Actually, any means for contacting glass with insoluble phosphate forming metal ion in alkaline solution is suitable so long as the interaction between particles is sufficiently mild to prevent an unusually large amount of surface grinding such that insoluble phosphates formed on the surface are not removed.

The low softening point glass may be added as a granular or fine powder to a suitable form of reinforcement, for example, glass mat, and the reinforcement carrying the low softening point glass may be impregnated with resin. It may be desirable to treat the reinforcement carrying the low softening glass with a binder before impregnation with resin.

It has been found that resins containing between 2 and 60 percent by weight low softening glass have improved flame retardancy. For most practical and preferred reasons, compositions containing 10 to 30 percent by weight of the phosphate glass are most satisfactory.

The treated glass containing resin compositions may be improved by the incorporation of a blowing agent as well as conventional fire retardant additives such as those previously mentioned. Suitable blowing agents are solids which decompose on heating to temperatures between 150°–400° C. with evolution of nonflammable gas, for example, ammonia, nitrogen, water or carbon dioxide. Such materials as, for example, ammonium phosphates, dicyandiamide, melamine, guanidinium carbonate, N-nitro-N'-cyanoguanidine, uracil, barbituric acid and phosphoramide are suitable. These materials are used in concentrations ranging between 2–20 percent and preferably 5–10 percent by weight of the matrix resin. They can be conveniently added to the resin at the same time as the particulate low softening point glass. For example, when dicyandiamide is used an optimum oxygen index is obtained when the weight ratio of dicyandiamide to low softening point glass lies between 25/75 and 33/67.

Glass particles can be coated with insoluble phosphates as demonstrated by the following non-limiting examples.

EXAMPLE 1

In a one gallon cylinder is placed 1,330 grams of phosphate glass powder having a size ranging from 150–250 microns, a glass transition temperature of 160° C. as measured by differential calorimetry using the Du Pont Differential Thermal Analyzer according to the following procedure: A sample of the powdered glass and a reference sample of pure powdered silica are heated at a programmed rate of temperature increase of 20° C./min., and a graph is obtained of the difference between the samples plotted against the temperature of the reference sample. This curve typically, has a linear portion of a slope (A) and a second linear portion having a different slope (B) at high temperatures. The two linear portions are drawn so that they intersect, and the transformation temperature is taken as the temperature corresponding to the point of intersection. The phosphate glass composition has the following analysis: 3% water, 68.71% $P_2O_5$, 1.57% $Li_2O$, 3.23% $Na_2O$, 0.7% MgO, 1.06% CaO, 20.58% PbO, and 1.15% $B_2O_3$. To this is added 248 grams of barium hydroxide octahydrate (equivalent to 8% barium based on the weight of the glass), 1600 grams acetone and 400 grams ethanol. The cylinder is rolled on a roller mill at approximately 10 revolutions per minute for 48 hours. The material is removed from the cylinder, filtered and washed with approximately 500 milliliters of acetone. The glass is oven dried at 100° C. at 1 mm of Hg pressure for 4 hours. A particle size analysis of the dried material is as follows: 150–250 microns — 85%, less than 150 microns — 3% and greater than 250 microns — 12% by weight. The glass transition temperature of the material remains unchanged. Moisture resistance is assessed by placing samples of treated and untreated phosphate glass in a closed container over water having a relative humidity in the range of 90–100% at room temperature. Under these conditions, the untreated phosphate becomes a sticky mass in approximately 50 hours, while the treated material remains a free flowing powder for more than 250 hours.

EXAMPLE 2

In a procedure similar to that of Example 1, the untreated phosphate glass composition of Example 1 is treated with a 10% calcium hydroxide solution in 60/40 acetone/ethanol solvent as described in Example 1. The calcium metal ion concentration is equal to 10% of the weight of the untreated low softening phosphate glass. After 75 hours in the 90–100% relative humidity tester, a free flowing powder results.

EXAMPLE 3

A repeat of Example 2 using 96/4 ethanol/water as solvent yields a product which remains free flowing after 100 hours in the 90–100% relative humidity tester. After 150 hours, the product appears moist with some agglomeration.

EXAMPLE 4

Example 1 is repeated using water as a solvent. Similar results are obtained.

EXAMPLE 5

Example 2 is repeated using water as the solvent and similar results are obtained.

EXAMPLE 6

A composition of low softening glass employed in Example 1 is treated with magnesium hydroxide solution having a metal ion concentration equal to 10% of the weight of the low softening glass composition as described in Example 1. After 150 hours at 90–100% relative humidity, the material remains free flowing.

EXAMPLE 7

A glass reinforced polyester resin containing low softening point glass was prepared by mixing: 75 parts of a 51% styrene solution of polyoxypropylene(2.2)bisphenol A fumarate with 25 parts by weight of the low softening glass made in Example 1. To this is also mixed 0.3 parts triethyleneglycol/hydroquinone (1:1) and 1 part t-butylperoctoate. This blend was then added to two 23 centimeter squares of chopped strained glass matte in a mold and permitted to cure at 125° C. for 5 hours. A similar panel was prepared using untreated phosphate glass as described in Example 1.

These panels were then subjected to a weathering test in a chamber held at 35° C. at 90–100% relative humidity. The panel containing untreated phosphate glass was found to have large water droplets on the surface after 4–6 days, while the barium treated material produced a laminate which indicated no water droplets after 30 days in the chamber and which had an LOI value of 28.1

Panels made from materials of Example 2-6 produce similar results.

EXAMPLE 8

(A) Phosphate glass, treated with barium hydroxide as in Example 1, was used (at 70 parts resin solution/30 parts treated phosphate glass/11 parts melamine tartarate) in preparing a one ply laminate from a commercial fire retardant resin (Diamond Shamrock's Dion 6125); an identical panel was made using untreated phosphate glass. Some properties of the panels are:

|  | Untreated Glass | Treated Glass |
|---|---|---|
| Limiting Oxygen Index | 49.5 | 53.4 |
| Flame Spread Rating (ASTM E-K2) | 1.27 | 1.09 |
| Izod Impact Strength | 10.01 | 7.56 |

(B) Panels were prepared, using treated and untreated phosphate glass, as in (A) above, but using Hooker Chemical Company's Hetron 92C fire retardant resin.

|  | Untreated Glass | Treated Glass |
|---|---|---|
| Flex Strength (PSI) | 16200 | 18600 |
| Flex Modulus (PSI × 10$^6$) | 0.64 | 0.73 |
| Barcol Hardness | 41–50 | 36–45 |
| Izod Impact (Ft.-Lbs.) | 5.26 | 6.88 |
| Limiting Oxygen Index | 43.5 | 45.9 |
| ASTM E-84 Flame Spread | 26 | 500 |
| Smoke | 26 | 500 |

After 30 days exposure in a himidity chamber at 35° C. and 90–100% relative humidity, a sample of the material containing the treated phosphate glass had lost 3.4% of its initial weight and the limiting oxygen index had increased from 45.9 to 49.7. The untreated glass lost several times the weight as did the treated material.

What is claimed is:

1. A particulate relatively hydrophobic phosphate glass composition comprising a relatively hydrophilic phosphate glass containing 50–72 mol percent $P_2O_5$ having formed upon its surface water insoluble phosphate salts of metals selected from the group consisting of magnesium, calcium, barium, iron, aluminum, lead and zinc.

2. A composition of claim 1 wherein said phosphate glass contains minor amounts of $B_2O_3$.

3. A composition of claim 2 containing a minor amount of PbO.

4. A composition of claim 1 formed on relatively hydrophilic phosphate glass having the following composition: $B_2O_3$ 1.2–3.5%; $P_2O_5$ 50–72%; PbO 0–30%; and at least 1 oxide selected from the oxides of Cu, Ag, Au, Sc, Y, La, Ti, Zr, Hf, V, Nb, Ta, Cr, Mo, W, Mn, Tc, Re, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, Th, Pd, and U 0–5%; and which glass contains at least 1 oxide selected from alkali metal oxides and at least 1 oxide from alkaline earth metal oxides and zinc oxides.

5. A product of claim 1 made by the process of exposing a particulate phosphate glass to an alkaline solution containing metal ions selected from the group consisting of magnesium, calcium, barium, iron, aluminum, lead and zinc for a time sufficient to form water-insoluble compounds on the surface thereof.

6. A product of claim 5 wherein the metal ion concentration in said solution is from 5–25% of the weight of the glass particulate undergoing treatment.

7. A product of claim 6 wherein the metal ion concentration in said solution is from 8–10% of the weight of the glass particulate undergoing treatment.

8. A process for treating phosphate glass to render it relatively less hygroscopic which comprises exposing said glass to an alkaline solution containing metal ions selected from the group consisting of magnesium, calcium, barium, iron, aluminum, lead and zinc for a time sufficient to form relatively water-insoluble compounds on the surface thereof.

9. A process of claim 8 wherein the metal ion concentration is such that it ranges from 5–25% of the weight of the glass when said glass undergoing treatment is a particulate averaging 10–300 microns in diameter.

10. A fire retardant organic resin composition having incorporated therein a composition of claim 1.

11. A fire retardant organic resin composition having incorporated therein a composition of claim 4.

12. A resin composition of claim 10 having incorporated therein a blowing agent which decomposes upon heating to liberate one or more non-flammable gases.

13. A resin composition of claim 11 having incorporated therein a blowing agent which decomposes upon heating to liberate one or more non-flammable gases.

* * * * *